United States Patent [19]

Yajima

[11] Patent Number: 4,702,756

[45] Date of Patent: Oct. 27, 1987

[54] ENGINE INTAKE SYSTEM HAVING A SUPERCHARGER

[75] Inventor: Tsunao Yajima, Hiroshima, Japan

[73] Assignee: Mazda Motor Corporation, Hiroshima, Japan

[21] Appl. No.: 9,066

[22] Filed: Jan. 27, 1987

Related U.S. Application Data

[63] Continuation of Ser. No. 716,661, Mar. 27, 1985, abandoned.

[30] Foreign Application Priority Data

Mar. 27, 1984 [JP] Japan .................................. 59-60084
Apr. 10, 1984 [JP] Japan ............................. 59-52364[U]

[51] Int. Cl.$^4$ .............................................. B01D 46/12

[52] U.S. Cl. ....................................... 55/473; 55/487; 55/482; 123/559; 123/563

[58] Field of Search ......................... 55/473, 482, 487; 123/559, 563

[56] References Cited

U.S. PATENT DOCUMENTS 2,800,120 7/1957 Jendrassik ........................... 123/559
2,853,987 9/1958 Berchtold et al. .................. 123/559
3,575,167 4/1971 Michielsen ............................ 55/482
4,023,472 5/1977 Grunder et al. ....................... 55/482
4,090,857 5/1978 Ferri et al. ............................ 55/482
4,204,848 5/1980 Schulmeister et al. ............... 55/473
4,482,365 11/1984 Roach .................................. 55/432
4,488,532 12/1984 Mayer ................................ 123/559

FOREIGN PATENT DOCUMENTS 3200685 7/1983 Fed. Rep. of Germany ...... 123/563
2423633 11/1979 France ................................ 123/563
38-1153 2/1963 Japan .

*Primary Examiner*—Tim Miles
*Attorney, Agent, or Firm*—Fleit, Jacobson, Cohn & Price

[57] ABSTRACT

An engine intake system including a supercharger of a type wherein the intake air drawn from the intake air inlet port is compressed by the pressure of the exhaust gas before it is discharged through the intake air outlet port. A coarse air cleaner is provided in the intake pipe leading to the intake air inlet port and a fine air cleaner is provided in the intake passage communicating with the intake air outlet port, so that the pressure drop at the intake air inlet port can be minimized.

4 Claims, 7 Drawing Figures

ENGINE INTAKE SYSTEM HAVING A SUPERCHARGER

This application is a continuation of application Ser. No. 716,661, filed Mar. 27, 1985, now abandoned.

BACKGROUND OF THE INVENTION

1. Field of the Invention

The present invention relates to a supercharged engine, and more particularly to an engine having a supercharger of a type in which the intake air is compressed by the pressure of the exhaust gas before it is introduced into the combustion chamber.

2. Description of Prior Art

Hithertofore, proposals have already been made of an engine supercharger which utilizes the pressure of the exhaust gas produced in the engine exhaust passage for compressing the intake air before the intake air is introduced into the combustion chamber. This type of supercharger is considered as being advantageous over turbosuperchargers because it can provide a higher supercharging effect at low speed engine operation. A supercharger of this type generally includes a rotor having a plurality of mutually separated, axially extending gas passages and a casing supporting the rotor for rotation about an axis of rotation. The casing is provided with exhaust gas inlet and outlet openings and intake gas inlet and outlet openings which are located at opposite axial ends of the rotor. The arrangements are such that the intake air is drawn into the gas passages through the intake gas inlet opening and compressed by the pressure of the exhaust gas introduced into the gas passages through the exhaust gas inlet opening. As the rotor rotates, the gas passages are sequentially opened to the intake gas outlet opening so that the intake gas is forced by the exhaust gas to flow into the intake passage communicating with the intake gas outlet opening. Thereafter, the passages are opened to the exhaust gas outlet opening so that the exhaust gas is allowed to flow into the exhaust passage communicating with the exhaust gas outlet opening. Thus, it is required that the exhaust gas inlet opening and the intake gas outlet opening be located axially opposite to each other with respect to the rotor. An example of such a supercharger is disclosed by Japanese patent publication No. 38-1153. The supercharger disclosed by the Japanese patent publiction is of a type wherein the exhaust gas inlet and outlet openings are located at one axial end of the rotor and the intake gas inlet and outlet openings are located at the other axial end so that the exhaust gas and the intake gas change their flow directions in the gas passages. As disclosed in detail by the Japanese magazine "Nainen-Kikan (Internal Combustion Engines)" Vol. 15, No. 179, 1976 June issue, there is also known a so-called through-flow type wherein the gas inlet and outlet openings are arranged so that the exhaust gas and the intake gas flow axially through the gas passages without changing the flow directions.

The supercharger of the aforementioned type is considered as being particularly suitable for diesel cycle engines, but can of course be used in gasoline engines as well.

In this type of supercharger, the passages in the rotor are scavenged by the air drawn from the intake gas inlet opening and passed through the passages to the exhaust gas outlet opening. It should, however be noted that, where the intake gas inlet opening is subjected to a suction pressure, it is likely that the scavenging cannot effectively be performed with the result that the exhaust gas is retained in the passages until the passages are opened to the intake gas inlet opening. This will cause the residual exhaust gas being mixed with the intake gas possibly causing an unstable combustion of the intake gas. It is therefore advisable to make the flow resistance of the intake passage upstream of the intake gas inlet opening as small as possible. For that purpose, the air cleaner provided upstream of the supercharger may be of a relatively coarse type having a relatively small flow resistance. However, the use of such coarse air cleaner is disadvantageous in that relatively large dust particles may be allowed to pass through the supercharger into the engine.

OBJECT OF THE INVENTION

It is therefore an object of the present invention to provide an engine supercharging system in which flow resistance upstream of the supercharger can be decreased without sacrificing the function of the air cleaner.

Another object of the present invention is to provide an engine intake system having a supercharger of a type wherein the intake air is compressed by the pressure of the exhaust gas, with means for preventing air cleaning means from being clogged by dust contained in the exhaust gas.

A further object of the present invention is in an engine intake system having a supercharger of a type wherein the intake air is compressed by the pressure of the exhaust gas, to prevent the exhaust gas from being passed to the air cleaning means during the engine starting.

SUMMARY OF THE INVENTION

According to the present invention, the above and other objects can be accomplished by an engine intake system including a supercharger of a type wherein the intake air drawn from intake air inlet port means is compressed by the pressure of the exhaust gas before it is discharged through intake air outlet port means, characterized by first air cleaner means provided in first intake air conduit means leading to the intake air inlet port means and second air cleaner means provided in second intake air conduit means communicating with said intake air outlet port means, said first air cleaner means being of a relatively coarse mesh which can block relatively coarse dust particles, said second air cleaner means being of a relatively fine mesh which can block relatively fine dust particles, whereby the flow resistance upstream of the supercharger can be decreased but the intake air can satisfactorily be cleaned before it is drawn into the engine.

With this arrangement of the present invention, it becomes possible to weaken the suction pressure at the intake air inlet port of the supercharger since the flow resistance by the first air cleaner means is relatively low. It is therefore possible to ensure satisfactory passage scavenging in the supercharger. In a preferable mode of the present invention, the first and second air cleaner means are provided in a single casing as a unit, so that they can be mounted in a relatively small space.

In the supercharger of the aforementioned type, there is a tendency that the exhaust gas is allowed to pass to the intake air outlet port by being mixed with the intake air during engine starting. The exhaust gas which has thus been allowed to pass to the intake air outlet port may then accelerate clogging of the second air cleaner means, which has a fine filter element. Therefore, according to a preferable aspect of the present invention, there is provided a bypass conduit connecting the first conduit means with the second conduit means upstream of the second air cleaner means, and valve means for closing the communication between the supercharger and the second air cleaner means and opening the bypass conduit to the second air cleaner means during the engine starting period.

The above and other objects and features of the present invention will become apparent from the following descriptions of preferred embodiments, taking reference to the accompanying drawings.

BRIEF DESCRIPTION OF THE DRAWINGS

FIG. 2(*b*) is a view showing the operation of the supercharger;

DESCRIPTION OF THE PREFERRED EMBODIMENTS

Figure 1:
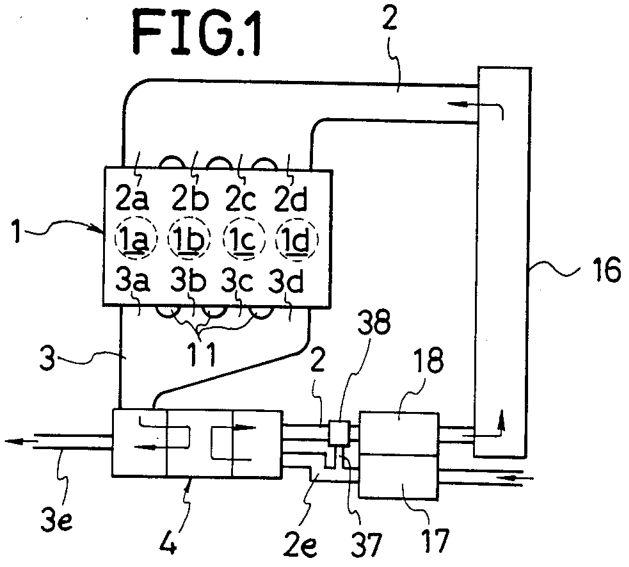
FIG. 1 is a diagrammatical illustration of an engine showing a general arrangement of the intake system in accordance with one embodiment of the present invention.

Referring to the drawings, particularly to FIG. 1, there is shown an engine 1 having cylinders 1*a,* 1*b,* 1*c* and 1*d* which are connected with an intake passage 2 through branch passages 2*a,* 2*b,* 2*c* and 2*d,* respectively. The cylinders 1*a,* 1*b,* 1*c* and 1*d* are also connected with an exhaust passage 3 respectively through branch passages 3*a,* 3*b,* 3*c* and 3*d.* Between the intake passage 2 and the exhaust passage 3, there is provided a supercharger 4.

Figure 2:
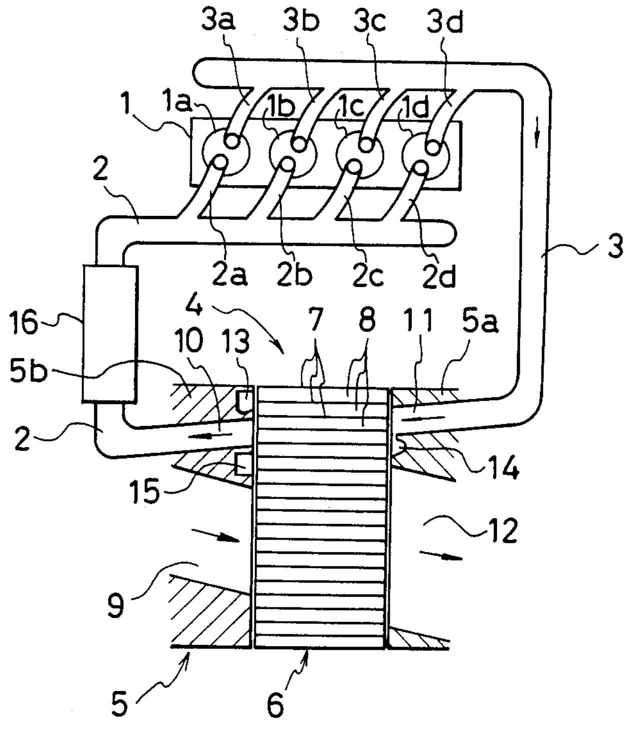
FIG. 2(*a*) is a view showing the supercharger rotor in a developed condition.
Figure 2B:
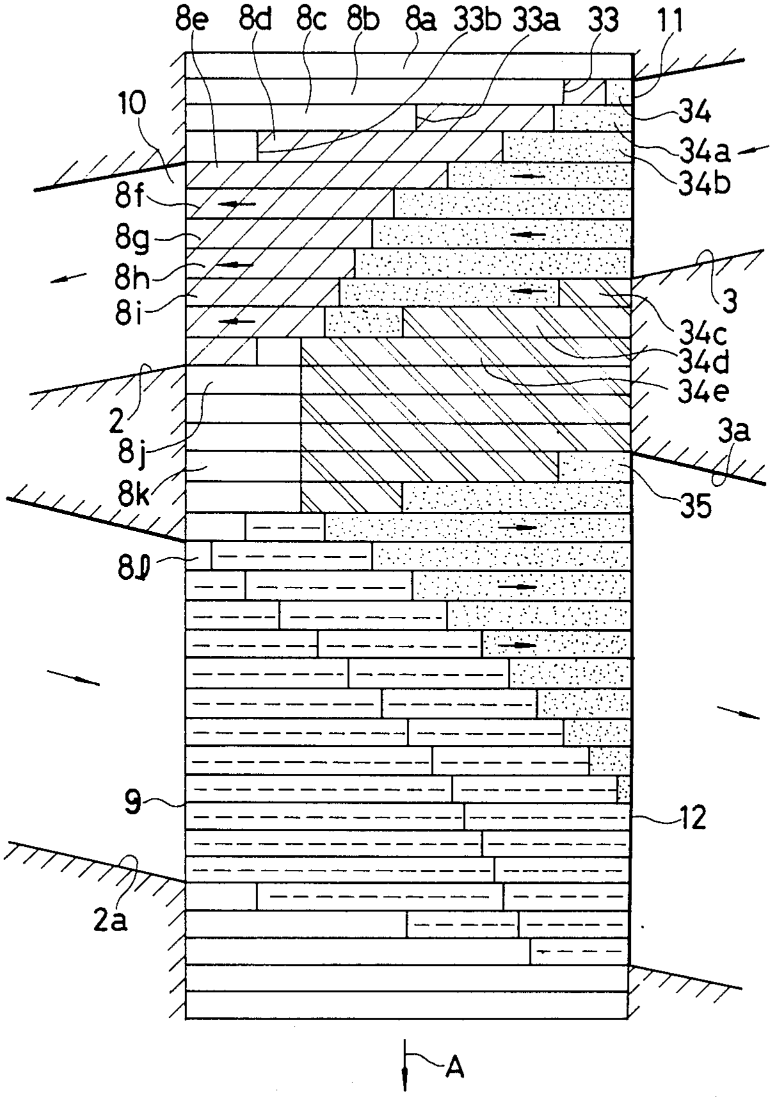

Referring to FIG. 2(*a*) together with FIG. 1, it will be noted that the supercharger 4 includes a rotor 6 which is rotatably disposed in a casing 5. As clearly shown in FIG. 2(*a*), the rotor 6 has a plurality of axially extending partitions 7 which define mutually separated, axially extending gas passages 8. The casing 5 has end walls 5*a* and 5*b* respectively, at opposite axial ends of the rotor 6. The end wall 5*a* is formed with an exhaust gas inlet port 11 and an exhaust gas outlet port 12, which are circumferentially offset from each other. The end wall 5*b* is formed with an intake gas inlet port 9 and an intake gas outlet port 10 at circumferentially offset portions.

As shown in FIG. 2(*a*), the exhaust gas inlet port 11 of the casing 5 is connected with the exhaust passage 3 and the intake gas outlet port 10 is connected with the intake passage 2. The exhaust gas outlet port 12 is connected with an exhaust pipe 3*a* whereas the intake gas inlet port 9 is connected with an intake pipe 2*e.*

Although not shown in the drawings, the rotor 6 is driven by a suitable mechanism.

In operation, the rotor 6 is continuously driven and the exhaust gas from the exhaust ports is directed through the exhaust passage 3 and the inlet port 11 to the gas passages 8 in the rotor 6. The exhaust gas is then discharged to the exhaust pipe 3*e* through the outlet port 12 when the gas passages 8 are opened to the outlet port 12. In the casing 5, the exhaust gas inlet port 11 is located axially opposite to the intake gas outlet port 10 so that the exhaust gas pressure in the exhaust passage 3 is applied to one end of the gas passage 8 when the gas passage 8 is opened to the inlet port 11. The pressure is then transmitted longitudinally through the passage 8 compressing the intake air in the passage 8 and reaches the other end of the passage 8 which is opened to the outlet port 10. Thus, the intake air is discharged into the intake passage 2 in a compressed condition.

Referring to FIG. 2(*b*), there are shown the gas passages 8 in the rotor 6 in extended positions. The uppermost passage 8*a* is shown as being filled by the intake air. Since the passage 8*a* is closed at both ends, the air in the passage 8*a* is in a stationary condition. The adjacent passage 8*b* is in a more advanced phase and has one end opened to the exhaust gas inlet port 11 so that a compression wave is produced at the end as shown by the numeral 33. The exhaust gas is admitted to the passage 8*b* as shown by the numeral 34. In the passages 8*c* and 8*d* which are in a more advanced phase, the compression waves are propagated as shown by the numerals 33*a* and 33*b* and the exhaust gas is admitted to a further depth in the passages as shown by the numerals 34*a* and 34*b.* These passages 8*c* and 8*d* are still closed at the other ends so that the intake air in the vicinity of these ends is stationary. In the passage 8*e,* the other end is opened to the intake gas outlet port 10 and the compression wave has reached the outlet port 10. Thus, the intake air is discharged under a supercharged condition into the intake passage 2. In the passages 8*f,* 8*g* and 8*h,* the discharge of the intake air is continued and the exhaust gas flows in the passages in the direction of the intake air flow.

The passage 8*i* is disconnected from the exhaust gas inlet port 11 so that the flow of the exhaust gas ceases at the end adjacent to the port 11 as shown by the numeral 34*c.* Thereafter, the exhaust gas expands in the passages as shown by the numerals 34*d* and 34*e.* The passage 8*j* is disconnected from the intake gas outlet port 10 so that the flow in the passage ceases. The passage 8*k* is open at one end to the exhaust gas outlet port 12 so that the exhaust gas is expanded at this end as shown by the numeral 35. The expansion of the exhaust gas progresses as the phase advances. In the passage 8*l,* the other end is open to the intake air inlet port 9 so that intake air under atmospheric pressure is admitted to the passage expelling the expanded exhaust gas into the exhaust pipe 3*a.* It will therefore be understood that the passages 8 are scavenged by the intake air.

Referring again to FIG. 2(*a*), it will be noted that the casing 5 of the supercharger 4 is formed at a side adjacent to the intake air outlet port 10 with a compression pocket 13, which is located at a trailing side of the port 10 as seen in the direction of rotation of the rotor 6, and with an expansion pocket 15 at a leading side of the port 10. The casing 5 is further formed at a side adjacent to the exhaust port 11 with a gas pocket 14 which is located at a leading side of the port 11 as seen in the direction of the rotation of the rotor 6. The provision of the pocket 13 is effective to provide a supercharging effect even in a low speed region of the engine operation. The pockets 14 and 15 make it possible to carry out the scavenging of the gas passages 8 by low pressure intake air throughout the engine operation. It will further be noted that the intake passage 2 is provided with an intercooler 16 for cooling the compressed intake air by an atmospheric air.

Figure 3:
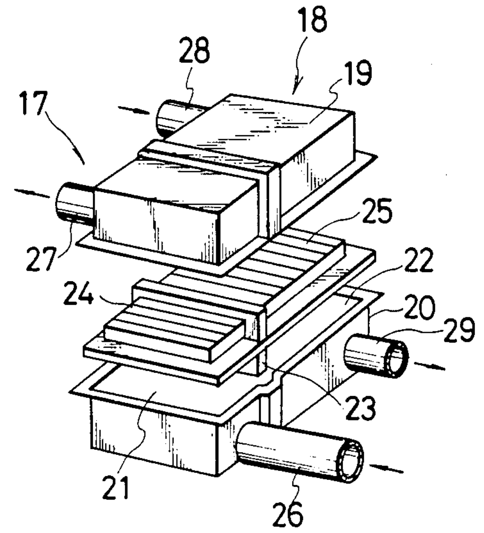
FIG. 3 is an exploded perspective view showing an example of the air cleaner assembly.

In FIG. 1, it will be noted that a first air cleaner 17 is provided in the intake pipe 2*e* and a second air cleaner 18 is provided in the intake passage 2. As shown in FIG. 3, the air cleaners 17 and 18 are located in a single casing comprising casing halves 19 and 20 which are connected together. In the casing, there is a partition plate 23 which divides the interior space of the casing into a first chamber 21 and a second chamber 22. In the first chamber 21, there is a filter element 24 of a relatively coarse mesh, for example, 60 to 80 microns. In the second chamber 22, there is filter element 25 of a relatively fine mesh, for example, an element finer than 20 microns. The casing has a first inlet 26 and a first outlet 27 communicating with the first chamber 21 at the opposite sides of the filter element 24. The casing further has a second inlet 28 and a second outlet 29 communicating with the second chamber 22 at the opposite sides of the second filter element 25.

The first inlet 26 and the first outlet 27 of the casing are connected with the intake pipe 2*e* whereas the second inlet 28 and the second outlet 29 are connected with the intake passage 2. Between the intake pipe 2*e* downstream of the first air cleaner 17 and the intake passage 2 upstream of the second air cleaner 18, there extends a bypass passage 37. A valve 38 is provided at the junction between the bypass passage 37 and the intake passage 2.

Figure 6:
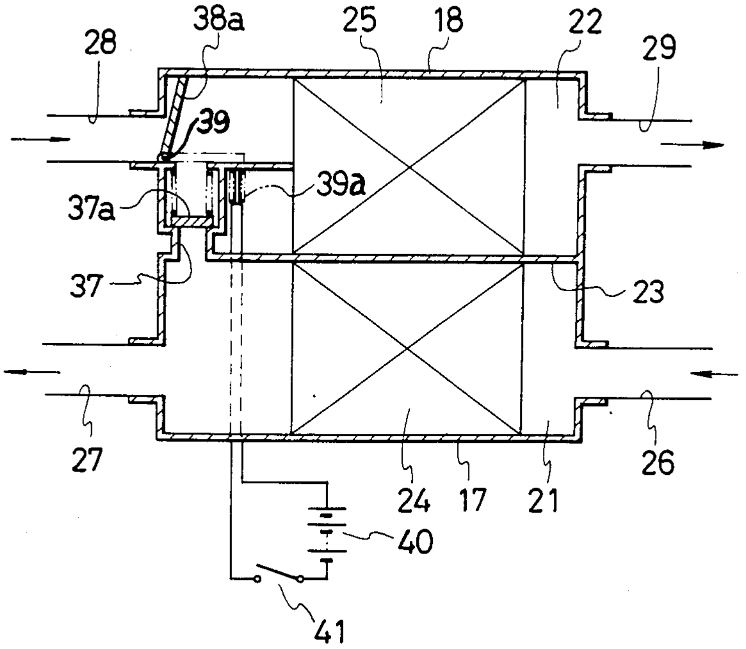

Referring to FIG. 6, the bypass passage 37 is formed between the chambers 21 and 22 across the partition 23 in the casing of the air cleaners 17 and 18. In the second chamber 22 upstream of the filter element 25, there is provided a valve plate 38*a* which constitutes the aforementioned valve 38. The valve plate 38*a* is mounted at its one edge by on a pin 39 for pivotal movement between the position shown by a solid line and the position shown by a phantom line in FIG. 6. In the position shown by the solid line, the valve plate 38*a* closes the second inlet 28 and opens the bypass passage 37. However, in the position shown by the phantom line, the valve plate 38*a* opens the second inlet 28 and closes the bypass passage 37. Although not shown in FIG. 6, a spring is provided for biasing the valve plate 38*a* toward the position shown by the solid line. During operation of the engine, the intake air compressed in the supercharger is forced to flow through the second inlet 28 into the second chamber 22 so that the valve plate 38*a* is forced to the position shown by the phantom line. In order to maintain the valve plate 38*a* in the position shown by the phantom line, there is provided a solenoid 39*a* which is adapted to be energized by an electric power source 40 through an engine ignition switch 41. It will therefore be understood that, when the engine is stopped, the valve plate 38*a* is released and returned to the position shown by the solid line. During engine starting, the intake air is drawn from the first inlet 26 through the coarse filter element 24 and passes through the bypass passage 37 and the fine filter element 25 to the intake passage 2, bypassing the supercharger 4. Thus, it is possible to prevent the engine exhaust gas from being allowed to flow into the intake passage 2 by being mixed with the intake air. The bypass passage 37 is provided with a check valve 37*a* which opens only toward the second chamber 22. When the engine is started, the supercharger 4 starts to function in a normal manner so that the intake air is discharged from the supercharger 4, under pressure, to the intake passage 2. The intake air then moves the valve plate 38*a* to the position shown by the phantom line and the valve plate 38*a* is then maintained in that position by the solenoid 39*a*.

Figure 4:
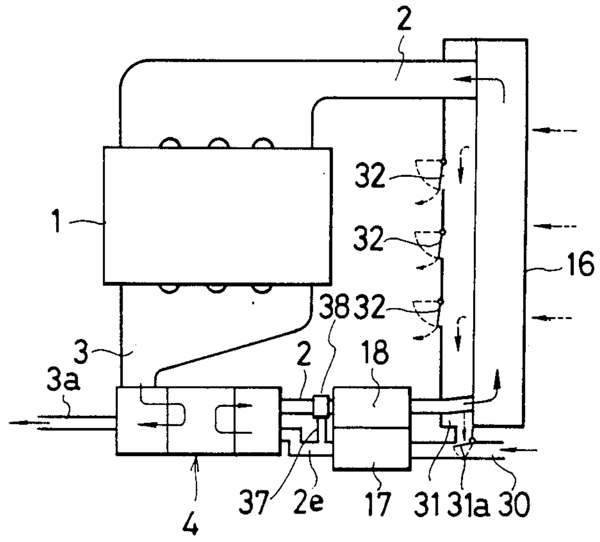
FIG. 4 is a view similar to FIG. 1 but showing another embodiment of the present invention.

Referring now to FIG. 4, the embodiment shown therein includes an auxiliary intake pipe 31 which extends along the rear side of the intercooler 16 and has air intake openings (not shown) in the front side thereof. The auxiliary intake pipe 31 is connected at one end with the intake pipe 2*e* upstream of the first air cleaner 17. At the junction between the auxiliary intake pipe 31 and the intake pipe 2*e*, there is provided a valve 31*a* which is normally maintained at a position shown by a phantom line so that the inlet end 30 of the intake pipe 2*e* is closed and the auxiliary intake pipe 31 is opened to the intake pipe 2*e*. When the vehicle equipped with the engine 1 is running, air comes into the inlet 30 of the intake pipe 2*a* so that the valve 31*a* is moved to the position shown by a solid line. The auxiliary intake pipe 31 is provided at the rear wall with valves 32 which are adapted to be opened by ram air pressure, which is applied to the valves 32 when the vehicle is running. Thus, there is produced an air flow around the intercooler 16 so that the cooling function of the cooler 16 is assisted by the air flow. When the vehicle is stationary, the valves 32 are closed and the valve 31*a* is moved to the position shown by the phantom line. Therefore, the air is drawn through the auxiliary intake pipe 31 assisting the function of the intercooler 16.

Figure 5:
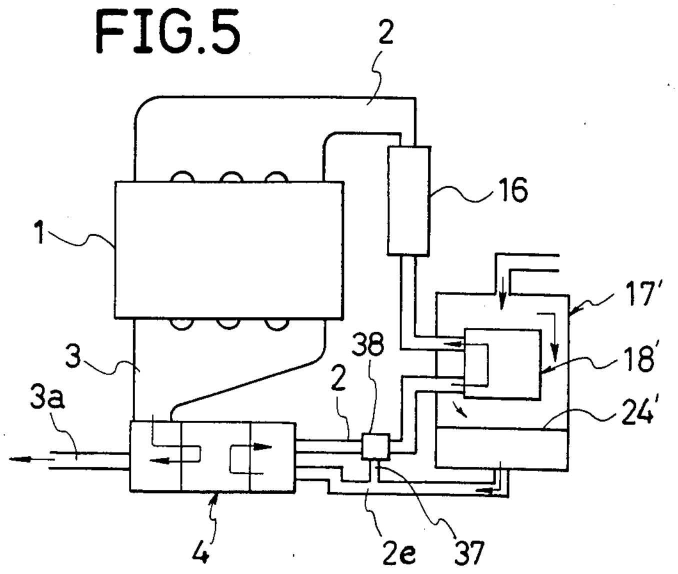
FIG. 5 is a view showing a further embodiment of the present invention; and, FIG. 6 is a sectional view showing details of the air cleaner assembly and the valve incorporated in the air cleaner assembly.

FIG. 5 shows another embodiment of the present invention in which the second or fine air cleaner 18' is located in the first or coarse air cleaner 17' at a position upstream of the coarse filter element 24' in the air cleaner 17'. With this arrangement, it is possible to cool the compressed air by the fresh air which is being drawn through the first air cleaner 17'.

The invention has thus been shown and described with reference to specific embodiments. However, it should be noted that the invention is in no way limited to the details of the illustrated arrangements, and changes and modifications may be made without departing from the scope of the appended claims.

What is claimed is:

1. An engine intake system including a supercharger of a type comprising a casing, a rotor provided in said casing for rotation and having a plurality of axially extending cells which are arranged in circumferential direction with respect to each other, a first end wall provided on said casing at an end adjacent to one axial end of said rotor and formed with exhaust gas inlet port means and exhaust gas outlet port means, a second end wall provided on said casing at the other axial end of the rotor and formed with intake air inlet port means and intake air outlet port means, wherein intake air introduced into the rotor through the intake air inlet port means is compressed in said rotor under pulsating pressure of the exhaust gas introduced into the rotor before the intake air is discharged through the intake air outlet port means, a part of the intake air being passed through the axially extending cells to the exhaust gas outlet port means to cool the rotor, first intake passage means connected with said intake air inlet port means, second intake passage means connecting said intake air outlet port means with engine combustion chamber means, first exhaust passage means connecting said exhaust gas inlet port means with said engine combustion chamber means, second exhaust passage means connected with the exhaust gas outlet port means, bypass passage means bypassing said supercharger and extending between said first and second intake passage means, bypass valve means for normally closing said bypass passage means and opening the bypass passage means at least in an engine start period, intake air cooling means provided in said second intake passage means for cooling the intake air from the intake air outlet port means, first and second air cleaner means including first filter element means located in the first intake passage means upstream of a portion where the bypass passage means is connected with the first intake passage means, characterized by the fact that said first filter element means is of a relatively large mesh size, said first and second air cleaner means including second filter element means provided in said second intake passage means downstream of a portion where the bypass passage means is connected with the second intake passage means, said second filter element means being of a mesh size smaller than that of said first filter element means.

2. An engine intake system in accordance with claim 1 in which said first and second air cleaner means are located in a single casing having partition means for dividing the interior of the casing into two chambers respectively for the first and second air cleaner means.

3. An engine intake system in accordance with claim 1 in which said first air cleaner means includes a casing and said second air cleaner means is located in the casing for the first air cleaner means so that intake air passing through the second air cleaner means is cooled by intake air passing through the first air cleaner means.

4. An engine intake system in accordance with claim 1 in which said first filter element means is of a mesh size between 60 and 80 microns and said second filter element means is of a mesh size less than 20 microns.

* * * * *